(12) United States Patent
Amstutz

(10) Patent No.: US 12,012,979 B2
(45) Date of Patent: Jun. 18, 2024

(54) ACTUATING SYSTEM FOR A VALVE

(71) Applicant: Contelec AG, Biel/Bienne (CH)

(72) Inventor: Meric Amstutz, Port (CH)

(73) Assignee: Contelec AG, Biel/Biennem (CH)

( * ) Notice: Subject to any disclaimer, the term of this patent is extended or adjusted under 35 U.S.C. 154(b) by 677 days.

(21) Appl. No.: 16/741,960

(22) Filed: Jan. 14, 2020

(65) Prior Publication Data

US 2020/0224684 A1     Jul. 16, 2020

(30) Foreign Application Priority Data

Jan. 15, 2019   (EP) .................................. 19151967

(51) Int. Cl.
| | |
|---|---|
| *F15B 21/08* | (2006.01) |
| *F16K 31/04* | (2006.01) |
| *F16K 31/12* | (2006.01) |
| *F16K 37/00* | (2006.01) |
| *G05B 19/042* | (2006.01) |

(52) U.S. Cl.
CPC ............ *F15B 21/082* (2013.01); *F15B 21/08* (2013.01); *F16K 31/046* (2013.01); *F16K 31/12* (2013.01); *F16K 37/0041* (2013.01); *F16K 37/0083* (2013.01); *G05B 19/042* (2013.01); *G05B 2219/25045* (2013.01)

(58) Field of Classification Search
CPC ...... F15B 21/082; F15B 21/08; F16K 31/046; F16K 31/12; F16K 37/0041; F16K 37/0083; G05B 19/042; G05B 2219/25045
See application file for complete search history.

(56) References Cited

U.S. PATENT DOCUMENTS

| | | | |
|---|---|---|---|
| 7,032,878 B2* | 4/2006 | Coura ..................... | F16K 1/446 137/554 |
| 9,071,120 B2* | 6/2015 | Takahashi ............... | H02K 33/16 |
| 9,887,612 B1* | 2/2018 | Eghbal ............... | H02K 41/0356 |
| 2001/0052771 A1* | 12/2001 | Jagiella ................ | G01D 5/2013 324/207.16 |
| 2015/0377383 A1 | 12/2015 | Feinauer et al. | |

FOREIGN PATENT DOCUMENTS

| | | | | |
|---|---|---|---|---|
| CN | 201653433 U | * | 11/2010 | |
| CN | 102052500 A | | 5/2011 | |
| CN | 102313062 A | | 1/2012 | |
| DE | 202006012959 U1 | | 10/2006 | |
| EP | 1422452 A1 | * | 5/2004 | ............. F16K 1/446 |
| EP | 2662868 A1 | | 11/2013 | |

\* cited by examiner

Primary Examiner — Angelisa L. Hicks
(74) Attorney, Agent, or Firm — GableGotwals

(57) ABSTRACT

An actuating system for a valve which can be used as a control valve. The valve system having an outer housing, a receiving region for a switching spindle of the valve, at least one inductive sensor running in parallel to the receiving region, and at least one substantially circular cylindrical position encorder.

15 Claims, 5 Drawing Sheets

ACTUATING SYSTEM FOR A VALVE

CROSS-REFERENCE TO RELATED APPLICATIONS

This United States application claims priority to European Application No. 19151967.7 filed 15 Jan. 2019, which is incorporated herein by reference.

The present invention relates to an actuating system for a valve. Furthermore, it relates to a valve which has the actuating system.

PRIOR ART

Actuating systems such as pneumatically operated control valves, for example, with single or double-acting drives can regulate the position of the valve using microprocessor electronics. This requires a displacement transducer which measures the current position of the valve. This is then continuously compared with a predetermined position setpoint, and if there is a control difference, the actual position of the valve is corrected.

For contactless measurement of the current position, one or more magnets can be arranged in a switching spindle of the valve. By way of example, DE 20 2006 012 959 U1 describes a valve with a switching spindle in which two magnets separated by a spring are arranged in such a way that their position can be detected by Hall sensors of the actuating system. For this purpose, however, it is necessary that the switching spindle is already set up for receiving the magnets and equipped with them when the valve is manufactured. This solution is also sensitive to magnetic interference fields.

Often, however, a valve whose switching swindle does not have magnets or a similar element that can function as a position encoder for a displacement transducer is installed in the systems. If such a valve is to be retrofitted with an actuating system, it is necessary that it is provided with a position encoder. For this purpose, for example, a disc-shaped position encoder containing a coil and a capacitor can be attached to one side of the switching spindle by means of a connecting part. It then functions as an active position encoder with a resonator or oscillating circuit. However, it is necessary that it is correctly aligned during assembly. It is not possible to check directly whether a correct mounting position has been achieved because no view of the position encoder is possible when it is inserted into the actuating system. A faulty assembly can then only be detected indirectly via a faulty function of the positioning system.

EP 1 422 452 A1 discloses a system for detecting the end of a movement of a closure of a valve. For this purpose, one or two position encoders are arranged on a switching spindle of the valve, the movement of which position encoders can respectively be detected by means of a magneto-resistive sensor.

The problem of the present invention is to provide an actuating system for a valve which can not only be attached to the valve during manufacture, but which is also suitable as a retrofit solution. The actuating system shall be designed in such a way that its position encoder cannot be misaligned during assembly and is insensitive to magnetic interference fields such as those caused by a magnetic valve or a servomotor. A further object of the invention is to provide a valve which has such an actuating system.

DISCLOSURE OF THE INVENTION

This problem is solved in one aspect of the invention by an actuating system for a valve, in particular for a proportional valve, which can be used, for example, as a control valve. This has an outer housing. A receiving region for a switching spindle of the valve runs in the outer housing. A receiving region is understood here as any free space in the outer housing which is suitable for receiving the switching spindle in terms of its position and dimensions. It is not necessary for the receiving region to be limited. Rather, it can also be a partial region of a larger free space in the outer housing. At least one inductive sensor runs in parallel to the receiving region. This functions as a displacement transducer for the actuating system.

Furthermore, the actuating system comprises at least one substantially circular cylindrical position encoder. This has an electrically conductive material. Along its longitudinal axis, a channel runs which is configured to accommodate the switching spindles of the valve. The position encoder is not permanently connected to the other parts of the actuating system. If the actuating system is a retrofit solution for an existing valve, it can instead be a single part attached to the switching spindle by passing it through the channel. The switching spindle and the position encoder can then be inserted into the outer housing. A movement of the switching spindle in parallel to the inductive sensor can then be measured inductively by the presence of the electrically conductive material in the position encoder. The term "electrically conductive" is understood here as all materials which have an electric conductivity at a temperature of 25° C. of more than $10^6$ S/m. In particular, copper and/or aluminium are suitable as a conductive material.

The circular cylindrical shape of the position encoder ensures that it is rotationally symmetrical to the switching spindle. It can therefore be rotated in any manner relative to the switching spindle during assembly, without it resulting in misalignment. Even a rotation of the outer housing with the inductive sensor arranged therein with respect to the switching spindle will not lead to any misalignment.

The position encoder consists of several parts. It has an encoder part. This enables the inductive position determination of the switching spindle. A connecting part is guided through the encoder part along its longitudinal axis. This surrounds the channel and has at least one engaging element. By means of the engaging element, the connecting part can be fixed to the switching spindle by it engaging in the switching spindle. This prevents the position encoder from slipping along the switching spindle. The connecting part preferably consists of a plastic, such that it does not interact with the inductive sensor. It is connected to the encoder part. This connection can, for example, occur through latching or gluing.

In order to be able to carry out a reliable position determination, it is preferred that a length of the encoder part is in the range of from 4 mm to 15 mm, in particular preferably in the range of from 10 mm to 15 mm. The connecting part is especially at least as long as the encoder part and preferably longer than this.

In one embodiment of the actuating system, the encoder part is a circular cylindrical encoder part consisting of the electrically conductive material. Such an encoder part functions as a passive encoder part with respect to the inductive sensor. In another embodiment, the encoder part has a ring-shaped magnetic flux conductor which is wrapped in a wire made of the electrically conductive material. Such an encoder part functions as an active encoder part with respect to the inductive sensor.

Furthermore, for reliable inductive measurement, it is preferred that an outer diameter of the position encoder is at least twice as large, in particular preferably at least two and a half times as large, as the diameter of the channel.

For a robust embodiment of the actuating system, it is preferred that the inductive sensor is arranged on a printed circuit board which is at least partially enclosed by an inner housing. The inner housing may not be electrically conductive in order not to impair the function of the inductive sensor and therefore consists in particular of a plastic. Here, a housing is understood to be both a separate component and a plastic insert moulding of the inductive sensor and the printed circuit board.

The inner housing preferably has a guide which is designed to partially accommodate the position encoder. In particular, it has the shape of a recess which runs in parallel to the receiving region and has a curved cross-section. The guide is here preferably shaped in such a way that the position encoder does not touch the inner housing.

In order to ensure position measurement in the entire working range of typical valves, it is preferred that the measurement path of the inductive sensor is in the range of from 3 mm to 100 mm, more preferably in the range of from 40 mm to 60 mm. Due to the functional principle of inductive sensors, the length of the inductive sensor is greater than its measurement path and is, for example, 150% of the measuring path.

In order to regulate the position of the valve, the actuating system preferably has an electronic position regulator in its outer housing, which position regulator is connected to the inductive sensor. The electronic position regulator contains in particular a microprocessor. Furthermore, an actuating device is provided which has a port for connecting to the valve. Depending on the embodiment of the valve, the actuating device can be an electric, a pneumatic or an electropneumatic actuating device.

A position regulator can process an external position setpoint. However, if a process setpoint is also to be compared with an actual process value, it is preferred that the electronic position regulator is connected to a process regulator which has an interface for a sensor located outside the outer housing. This sensor can then provide the actual process value. The electronic position regulator and the process regulator can be implemented in separate components or in a single component.

Furthermore, it is preferred that the actuating system has a user interface which is configured to supply the position setpoint to the electronic position regulator and/or to supply the process setpoint to the process regulator.

In another aspect of the invention, the object is solved by a valve, which is in particular a proportional valve which can be used, for example, as a control valve. This has a switching spindle which is guided through the position encoder of an actuating system according to the aspect of the invention described above.

Preferably, the switching spindle and the position encoder are inserted into the positioning system in such a way that a distance of at least 0.5 mm, more preferably at least 1.0 mm, is maintained between a shell surface of the position encoder and the inductive sensor. Furthermore, it is preferred that a distance between the inductive sensor and a possible inner housing, which is arranged between the inductive sensor and the position encoder, is at least 0.3 mm, more preferably at least 0.5 mm.

The switching spindle has a connecting element with which an engaging element of the position encoder engages. This enables an exact positioning of the position encoder on the switching spindle. The connecting element is preferably a recess and can in particular be designed as ring-shaped groove around the switching spindle.

In particular, the valve can be a pneumatic valve. This is then connected to an electropneumatic actuating device of the actuating system.

BRIEF DESCRIPTION OF THE DRAWINGS

Exemplary embodiments of the invention are shown in the drawings and explained in more detail in the subsequent description.

EXEMPLARY EMBODIMENTS OF THE INVENTION

Figure 1:
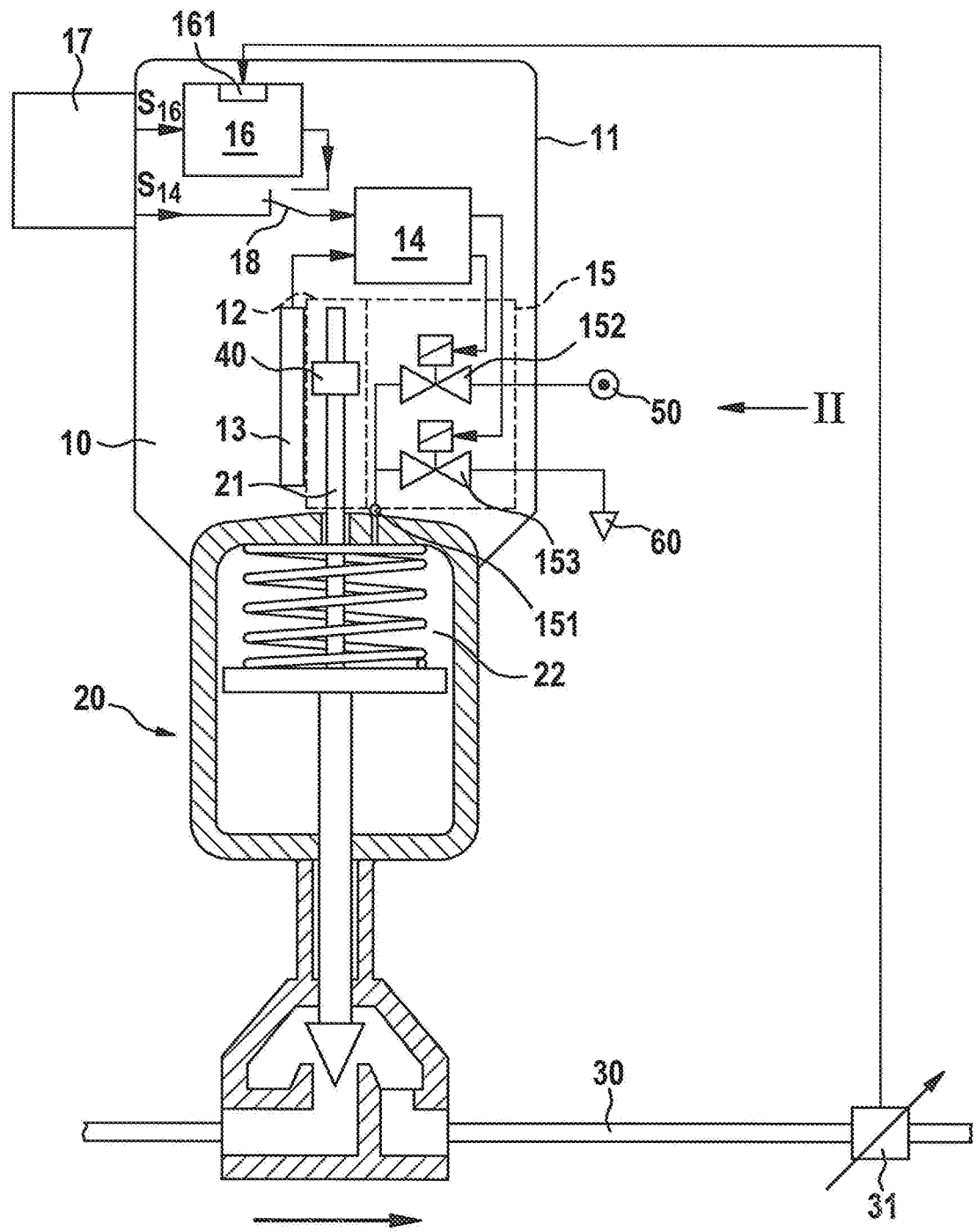
FIG. 1 shows a schematic longitudinal depiction of a valve according to an exemplary embodiment of the invention.
Figure 2:
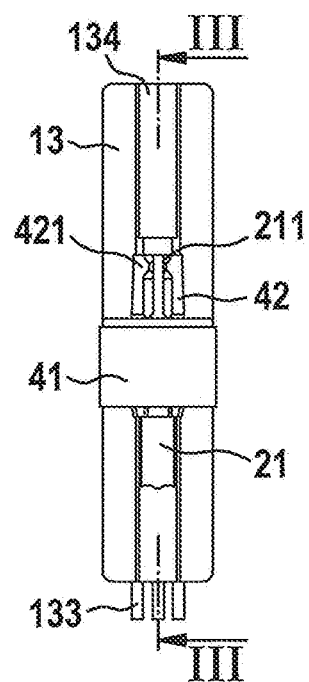
FIG. 2 shows a schematic view of a position encoder of a sensor element and a part of a switching spindle of the valve according to FIG. 1 from the viewing direction designated there as II.
Figure 3:
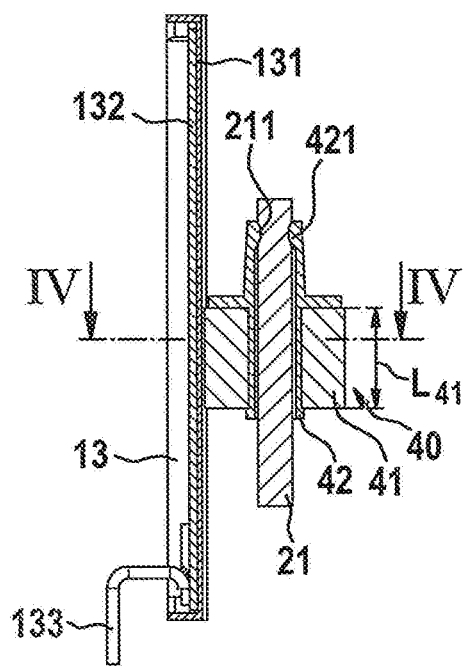
FIG. 3 shows a section through the depiction according to FIG. 2 along the line III-III.
Figure 4:
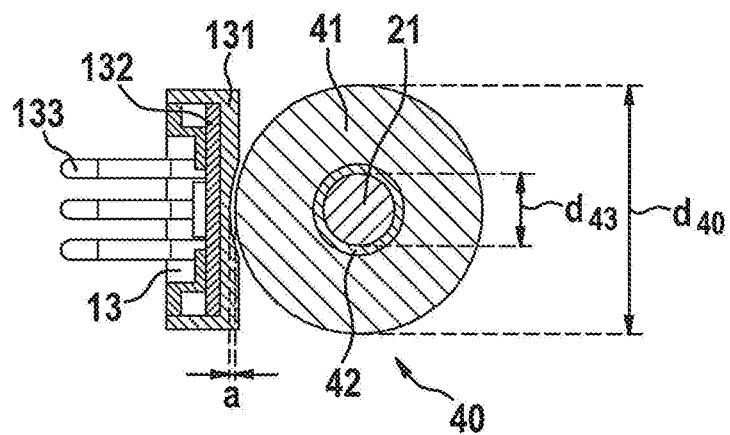
FIG. 4 shows a section through the depiction of FIG. 3 along the line IV-IV.
Figure 5:
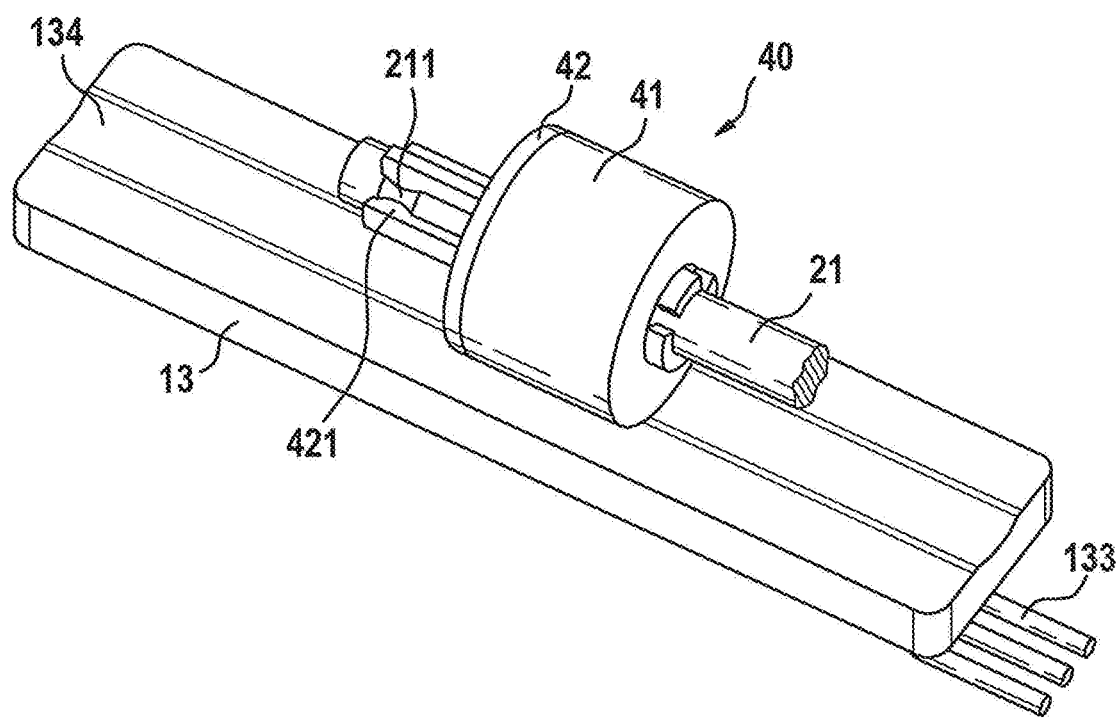
FIG. 5 shows an isometric depiction of the position encoder and a part of the switching spindle according to FIG. 2.
Figure 6:
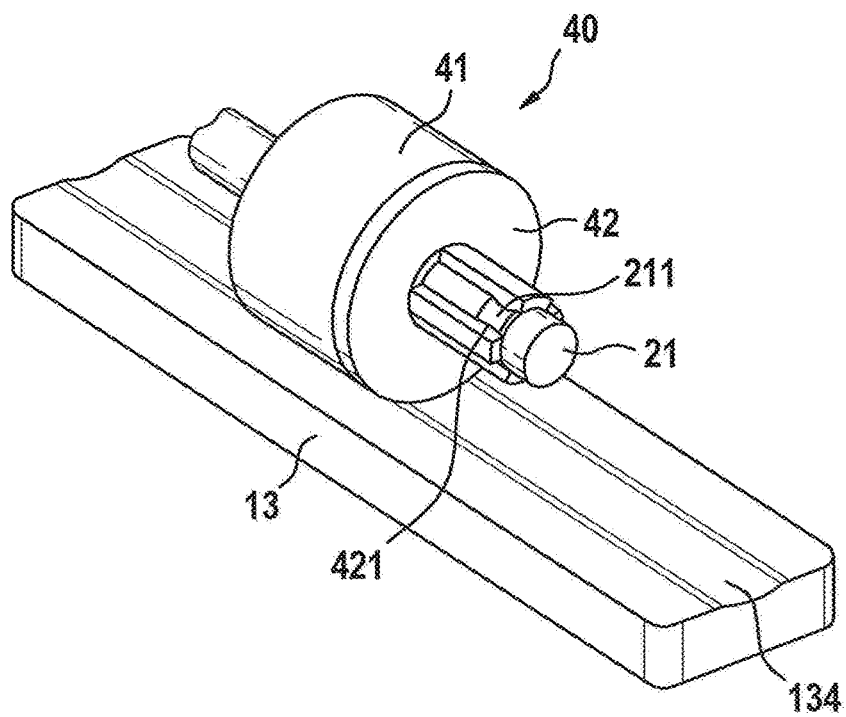
FIG. 6 shows another isometric depiction of the position encoder and a part of the switching spindle according to FIG. 2.

An actuating system 10 according to an exemplary embodiment of the invention, which is connected to a valve 20, is shown in FIG. 1. The valve 20 is designed as a pneumatic actuating valve and is arranged on a line 30. The actuating system 10 has an outer housing 11. In this housing, a receiving region 12 is defined, into which a switching spindle 21 of the valve 20 protrudes. A position encoder 40 is arranged on the switching spindle 21. A sensor element 13 is arranged in parallel to the receiving region 12. It supplies measurement data to an electronic position regulator 14, which controls an electropneumatic actuator 15. This has a port 151 to a pneumatic drive 22 of the valve 20. A vent valve 152 of the actuating device controlled by the position regulator 14 can feed compressed air from a pressure supply 50 through the port 151 into the pneumatic drive 22 in order to close the valve 20. An exhaust valve 153 of the actuating device 15, which is controlled by the electronic position regulator 14, can release air from the pneumatic drive into an exhaust air region 60 by means of the port 151. A process regulator 16 has an interface 161, to which a sensor 31 arranged in the line 30 downstream of the valve 20 can be connected. The sensor 31 is designed as a flow sensor in the present case. A user interface 17 with a display and buttons is applied to the outside of the outer housing 11. It allows the input of a position setpoint $S_{14}$ and the input of a process setpoint $S_{16}$. If the sensor 31 is not connected, a switch 18 in the outer housing 11 can be switched in such a way that the position setpoint $S_{14}$ is fed to the position regulator 14. An actual position of the switching spindle 21 is then calculated in the position regulator 14 from a signal of the sensor element 13 generated by its inductive interaction with the position encoder 40 and the actual position is compared with the position setpoint $S_{14}$. If there is a deviation between the actual value and the setpoint, the actual value is reset to the setpoint by means of a suitable control of the actuating device 15. If, on the other hand, the sensor 31 is connected, the switch 18 is switched in such a way that the position regulator 14 receives an input signal from process controller 16. This is calculated by comparing the process setpoint $S_{16}$, which is a flow setpoint in the present case, with the actual value of the flow measured by the sensor 31. The calculated value is transferred to the position regulator 14 where it replaces the position setpoint $S_{14}$.

The inductive interaction between the sensor element 13 and the position encoder 40 enables the exact positioning of the switching spindle 21 to be determined. These are shown in detail in FIGS. 2 to 6. The sensor element 13 has a 0.5 mm thick inner housing 131 made of a plastic in which an inductive sensor 132 is arranged on a printed circuit board with connecting cables 133. This is thermally fixed to the inner housing 131 by means of bores not shown. The position encoder 40 consists of an encoder part 41 and a connection part 42. The encoder part 41 is designed as a cylinder made of copper in the present case, having a length $L_{41}$ of 12.5 mm. Its outer diameter corresponds to the outer diameter $d_{40}$ of the position encoder 40 and is 18 mm in the present case. Along the longitudinal axis of the encoder part 41, a circular bore runs, into which the connecting part 42 is inserted. This consists of a plastic and has a channel 43 with a diameter $d_{43}$ of 4.9 mm inside it. This diameter $d_{43}$ corresponds to the outer diameter of the switching spindle 21. The connecting part extends over the entire length $L_{41}$ of the encoder part 41 and beyond. Its length is 25.1 mm. It ends in spring-shaped engagement elements 421, which engage in a groove 211 in a ring around the switching spindle 21 in the manner of a tongue and groove connection. On the side of the position encoder 40, on which the engagement elements 421 are located, the connecting part is substantially widened in one section to the outer diameter of the encoder part 41 and adhered to it there. The distance between the shell surface of the position encoder 40 facing towards the inductive sensor 132, which corresponds to the shell surface of the encoder part 41, and the surface of the inductive sensor 132 is 1.0 mm, and the distance a between the shell surface and the surface of the inner housing 131 is 0.5 mm. The inner housing 131 has a guide 134 which faces towards the position encoder. This has the shape of a recess with a curved cross-section, such that the distance between the shell surface and the inner housing is constant in the radial direction of the encoder part 41 in the region of the guide 134.

Figure 7:
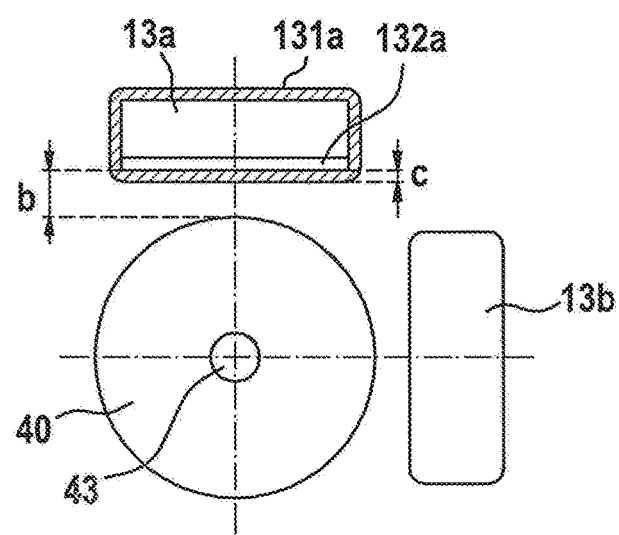
FIG. 7 shows a position encoder and two sensor elements in an exemplary embodiment of the actuating system according to the invention.

FIG. 7 shows that, in a different embodiment, the actuating system 10 can have two sensor elements 13a, 13b, which both run in parallel to the receiving area 12 but are arranged at an angle of 90 degrees to each other. This enables a redundant position measurement for safety-relevant applications of the valve 20. In this simplified depiction, which is not true to scale, it is also shown that the distance b between the shell surface of the position encoder 40 and the inductive sensor 132 is large enough to include the thickness c of the inner housing 131a of the sensor element 13a, as well as to ensure a sufficient installation tolerance. The same applies to the second sensor element 13b.

Figure 8:
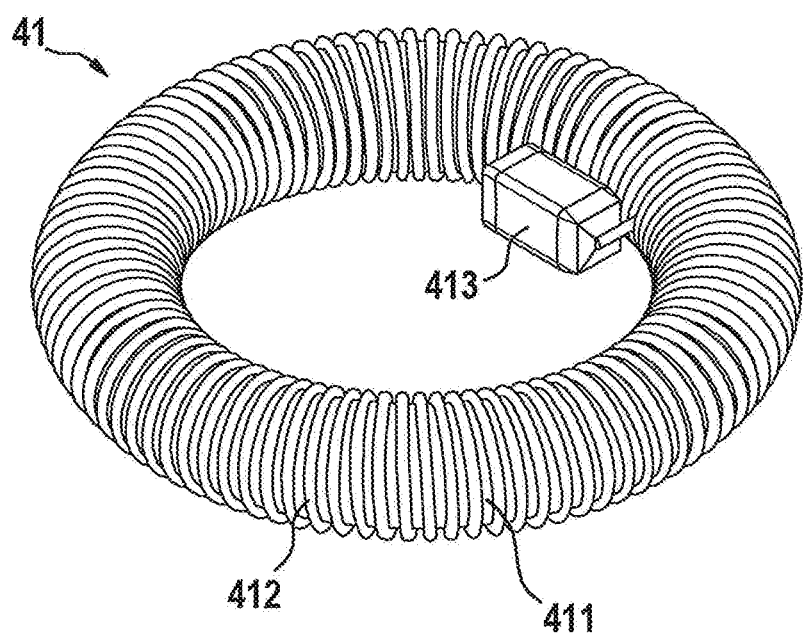
FIG. 8 shows an encoder part of a position encoder in an exemplary embodiment of the invention.

In an alternative exemplary embodiment, the encoder part 41 of the position encoder 40 is not a copper cylinder. As shown in FIG. 8, the encoder part instead has a ring-shaped magnetic flow conductor 411, which consists of ferrite. This is wrapped with a copper wire 412. A capacitor 413 is connected in series with the wire 412. Thus the wire 412 and the capacitor 413 form a resonator. This encoder part 41 functions as an active encoder part, while an encoder part 41 made of copper functions as a passive encoder part.

Figure 9:
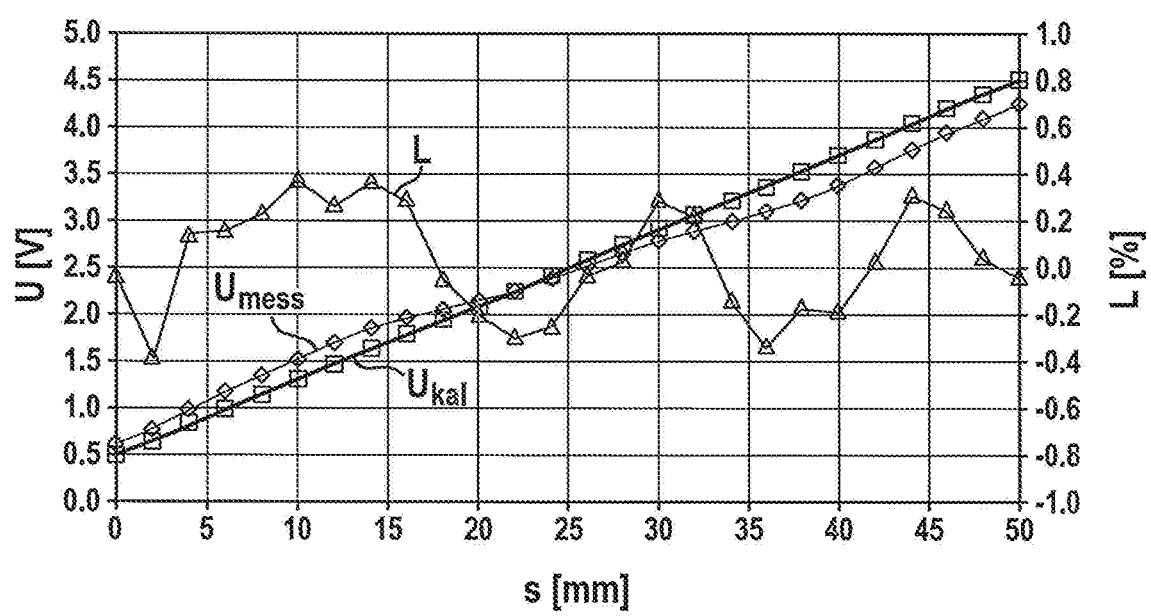
FIG. 9 shows, in a diagram, signals of an inductive sensor of an actuating system according to an exemplary embodiment of the invention.

In the exemplary embodiment described in FIGS. 1 to 6, the inductive sensor 132 has a measuring path s along the receiving region 12 of 50 mm and a length of 78 mm. In FIG. 9, the course of the measured voltage $U_{mess}$ and the course of the calibrated voltage $U_{kal}$ are plotted, by way of example, over this measuring path s. Furthermore, the course of the linearity L over the measuring path s is shown. After the calibration, there is only a non-linearity of approximately ±0.4%.

The actuating system 10 and the valve 20 can be manufactured together in the manner shown. However, it is also possible to retrofit a valve 20 to the actuating system 10. To do so, the position encoder 40 is applied to the switching spindle 21 by pushing the switching spindle 21 through the channel 43 until the engagement elements 421 engage in the recess 211. Then the actuating system is placed on the valve 20 in such a way that the switching spindle 21 protrudes into the receiving region 12 and the pneumatic drive 22 of the valve 20 is connected to the port 151 of the positioning system. If there is a sensor 31 in line 30, it is connected to the interface 161. The actuating system 10 is subsequently ready for operation. There is no danger of incorrect adjustment of the position encoder 40 during installation. As soon as it has reached a position defined by the recess 211 along the longitudinal axis of the switching spindle 21, it can be rotated about the switching spindle 21 as desired, without impairing the position measurement using the inductive sensor 132.

The invention claimed is:

1. Actuating system for a valve, the actuating system comprising an outer housing adapted for connection to a valve body of the valve, the valve body containing an actuator and a switching spindle, said actuating system further comprising, and the outer housing containing,:
    a receiving region for receiving the switching spindle of the valve;
    at least one inductive sensor running in parallel to the receiving region and being arranged on a printed circuit board;
    a non-conductive inner housing at least partially enclosing the at least one inductive sensor and the printed circuit board,
    at least one position encoder, the position encoder being substantially circular cylindrical and comprising an encoder part and a connection part:
        the encoder part having a longitudinal axis with a circular bore running therethrough and including an electrically conductive material; and
        the connection part having a channel therethrough and an engagement element at one end configured to be engageable in a groove of the switch spindle; the connection part being insertable into the circular bore of the encoder part.

2. The actuating system according to claim 1, wherein a length ($L_{41}$) of the encoder part is in a range of from 4 mm to 15 mm.

3. The actuating system according to claim 1, wherein the encoder part has an annular magnetic flux conductor which is wrapped with a wire made of the electrically conductive material.

4. The actuating system according to claim 1, wherein an outer diameter ($d_{40}$) of the position encoder is at least twice as large as a diameter ($d_{43}$) of the channel.

5. The actuating system according to claim 1, wherein the inner housing has a guide equipped to partially receive the position encoder.

6. The actuating system according to claim 1, wherein the inductive sensor has a measuring path(s) in a range of from 40 mm to 60 mm.

7. The actuating system according to claim 1, further comprising, in the outer housing,
- an electronic position regulator connected to the inductive sensor, and an actuating device having a port for connecting to the valve.

8. The actuating system according to claim 7 wherein the electronic position regulator is connected to a process regulator which has an interface for a sensor arranged outside the outer housing.

9. The actuating system according to claim 8, further comprising a user interface equipped to supply a position setpoint ($S_{14}$) to the electronic position regulator and/or to supply a process setpoint ($S_{16}$) to a process regulator.

10. The actuating system according to claim 1, wherein the switching spindle is guided by the position encoder.

11. The actuating system according to claim 10, wherein a distance (b) between a shell surface of the position encoder and the inductive sensor is at least 0.5 mm.

12. The actuating system according to claim 10, wherein the switching spindle has a connecting element with which an engagement element of the position encoder engages.

13. The actuating system according to claim 10, wherein the valve is a pneumatic valve connected to an electropneumatic actuating device of the actuating system.

14. The actuating system according to claim 1, wherein the non-conductive inner housing has a guide with a curved cross-section configured to partially receive the position encoder.

15. The actuating system according to claim 14, wherein the position encoder is positioned in the inner housing guide in such a way that the position encoder does not touch the non-conductive inner housing.

\* \* \* \* \*